United States Patent [19]
Goodnow

[11] Patent Number: 6,107,841
[45] Date of Patent: Aug. 22, 2000

[54] SYNCHRONOUS CLOCK SWITCHING CIRCUIT FOR MULTIPLE ASYNCHRONOUS CLOCK SOURCE

[75] Inventor: Kenneth J. Goodnow, Essex Junction, Vt.

[73] Assignee: International Business Machines Corporation, Armonk, N.Y.

[21] Appl. No.: 09/149,686

[22] Filed: Sep. 8, 1998

[51] Int. Cl.[7] .................................................. H03K 17/00
[52] U.S. Cl. ............................ 327/99; 327/298; 327/407
[58] Field of Search ............................. 327/99, 291, 293, 327/294, 298, 407

[56] References Cited

U.S. PATENT DOCUMENTS

| | | | |
|---|---|---|---|
| 4,398,155 | 8/1983 | Atwell, Jr. et al. | 328/55 |
| 4,419,629 | 12/1983 | O'Brien | 327/99 |
| 4,853,653 | 8/1989 | Maher | 331/49 |
| 4,899,351 | 2/1990 | Bonke | 375/108 |
| 5,122,677 | 6/1992 | Sato | 327/99 |
| 5,155,380 | 10/1992 | Hwang et al. | 327/99 |
| 5,231,636 | 7/1993 | Rasmussen | 370/100.1 |
| 5,274,678 | 12/1993 | Ferolito et al. | 375/108 |
| 5,315,181 | 5/1994 | Schowe | 326/93 |
| 5,483,185 | 1/1996 | Scriber et al. | 327/99 |
| 5,564,042 | 10/1996 | Ventrone et al. | 395/550 |
| 5,565,803 | 10/1996 | Fulcomer | 327/99 |
| 5,579,353 | 11/1996 | Parmenter et al. | 375/376 |
| 5,583,461 | 12/1996 | Lowe | 327/172 |
| 5,675,615 | 10/1997 | Watt | 327/354 |
| 5,796,288 | 8/1998 | Krech, Jr. et al. | 327/407 |

*Primary Examiner*—Terry D. Cunningham
*Assistant Examiner*—Quan Tra
*Attorney, Agent, or Firm*—Scully, Scott, Murphy & Presser; Eugene I. Shkurko, Esq.

[57] ABSTRACT

A clock switching system for providing synchronous glitch-free switching of a clock source from among one or more asynchronous clock sources comprises a multiplexor device for providing a system clock output signal corresponding to a first asynchronous clock source input, and a switch control circuit for generating first and second control signal. In response to the first control signal, the multiplexor device enables simultaneous coupling of a selected second asynchronous clock source to be switched to the multiplexor circuit, and decoupling the first asynchronous clock source input. Further in response to the first control signal, the system clock output is held at a first output level. In response to the second control signal, the second asynchronous clock source is coupled to the system clock output while both signals are at the first output level. The system clock output corresponding to the second asynchronous clock source occurs in synchronism with a subsequent transition of the second asynchronous clock source from the first voltage level to a second output level.

12 Claims, 2 Drawing Sheets

SYNCHRONOUS CLOCK SWITCHING CIRCUIT FOR MULTIPLE ASYNCHRONOUS CLOCK SOURCE

BACKGROUND OF THE INVENTION

1. Field of the Invention

The present invention relates generally to the field of clock circuits for a processor-based system, and more particularly, to a novel switching circuit for dynamically providing glitch-free switching between a plurality of asynchronous clocks.

2. Discussion of the Prior Art

In a processor-based device with internally generated clocks, the need exists for the ability to switch between multiple clock sources that are asynchronous to each other. This switch must be done in a minimum of time and guaranteeing that there are no spurious clock glitches or too small of a clock pulse width in either the on or off state. The switch must also guarantee that metastability problems are minimized.

No single prior art switching device meets all this criteria. For instance, known prior art clock switching devices such as described in U.S. Pat. Nos. 5,155,380 and 5,315,181 provide for synchronous glitch-free clock switching, however, only provide switching among two clock sources.

U.S. Pat. No. 5,231,636 describes a method of glitch less switching among a plurality of clock sources and implements edge detection, multiplexor (MUX), and synchronization circuitry to provide for glitch less switching. As described in U.S. Pat. No. 5,231,636, the MUX requires a number of select inputs with a number of active input lines commensurate with the number of switching sources. Furthermore, the clock switching device in U.S. Pat. No. 5,231,636 provides at least three latches flip-flops at the output which results in decreased switch response time. Moreover, metastability problems may still exist in such a prior art configuration.

It would be highly desirable to provide a clock switching system that is able to provide glitch less switching from among a plurality of asynchronous clock sources in response to a single switching signal.

It would additionally be highly desirable to provide a clock switching system that utilizes minimal logic circuitry to provide glitch less clock switching among multiple asynchronous clock sources of different frequency clocks and, consequently, results in minimal power consumption.

SUMMARY OF THE INVENTION

The present invention is directed to a clock switching circuit that satisfies the following requirements: expedited switching among multiple asynchronous clock sources of different frequency clocks 1-of-N different clocks, with no metastability problems, no glitches, and with no output pulses smaller than one of the switching clocks; the frequencies of the clock inputs are the highest frequency signals in the clock switching circuit; the switching is initiated from a single signal (along with selection signal); and, switching is completed before allowing a next switch to occur.

In accordance with the preferred aspect of the invention, there is provided: A clock switching system for providing synchronous switching of a clock source from among one or more asynchronous clock sources, said system comprising:

multiplexor means for providing a system clock output signal corresponding to a first asynchronous clock source input;

switch control means for generating first and second control signals;

means responsive to said first control signal for coupling a selected second asynchronous clock source to be switched to said multiplexor means, and decoupling said first asynchronous clock source input, said system clock output simultaneously being held at a first output level in response to said first control signal; and, means responsive to said second control signal for coupling said second asynchronous clock source to said system clock output, said second asynchronous clock source being coupled to said system clock output while at said first output level, wherein a transition to said system clock output signal corresponding to said second asynchronous clock source occurs in synchronism with a transition of said second asynchronous clock source from said first output level to a second output level.

Advantageously, the clock switch control circuit of the invention operates without the necessity of a higher frequency, independent clock source, and consumes less power as it is configured to minimize switching states of the active latch and gate components.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
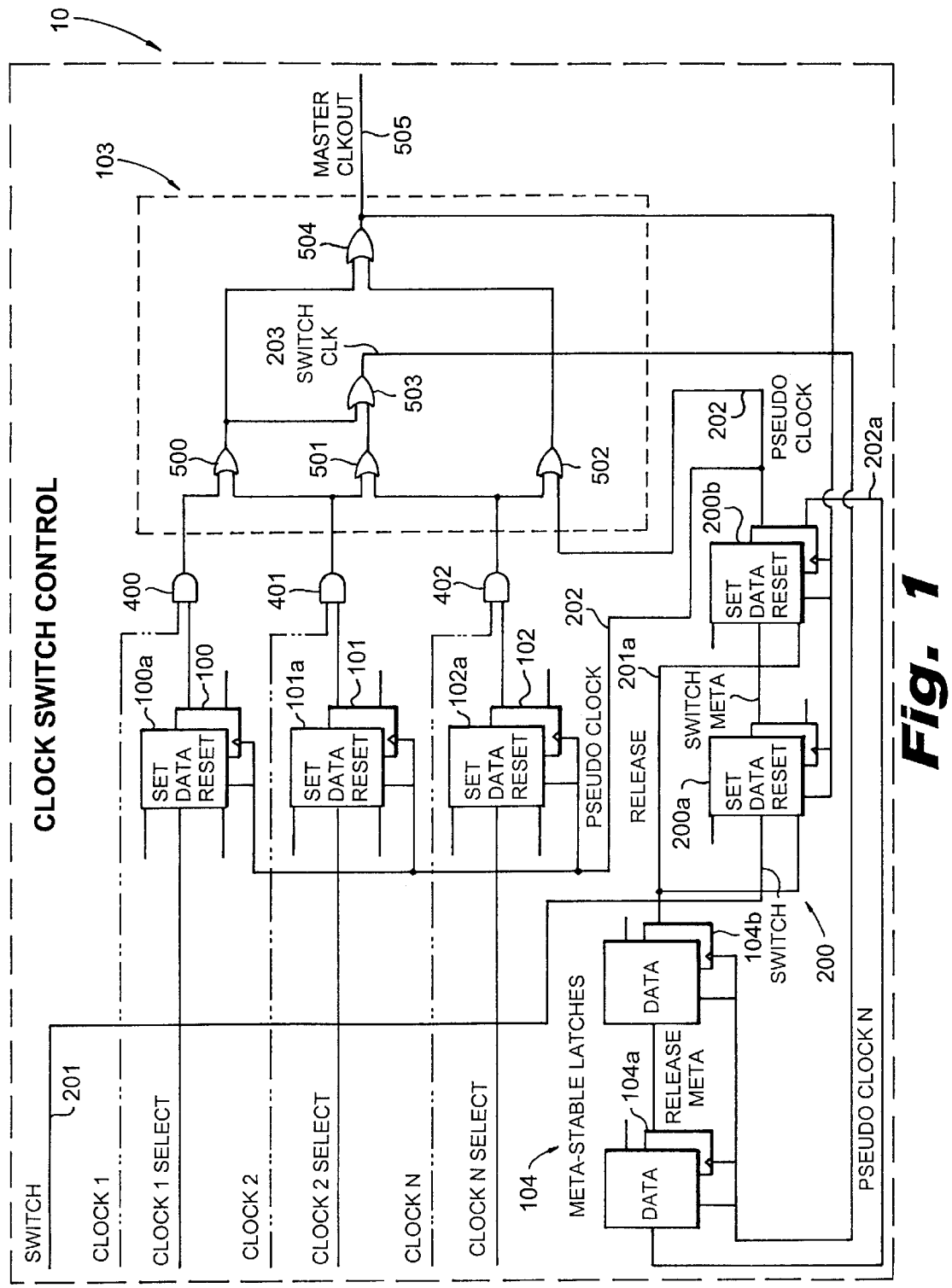
FIG. 1 is a schematic diagram illustrating the clock switch control circuit 10 of the present invention.

FIG. 1 is a schematic diagram illustrating the clock switch control circuit 10 of the present invention. As shown in FIG. 1, the circuit comprises one or more clock input sources, e.g., clock sources labeled CLOCK_1, CLOCK_2, ..., CLOCK_N. Associated with each clock input source is a corresponding clock select signal depicted in FIG. 1 as respective signals CLOCK_1_SELECT, CLOCK_2_SELECT, ..., CLOCK_N_SELECT and which may be activated from a microprocessor or like intelligent source prior to switching to that corresponding clock input source.

Figure 2:
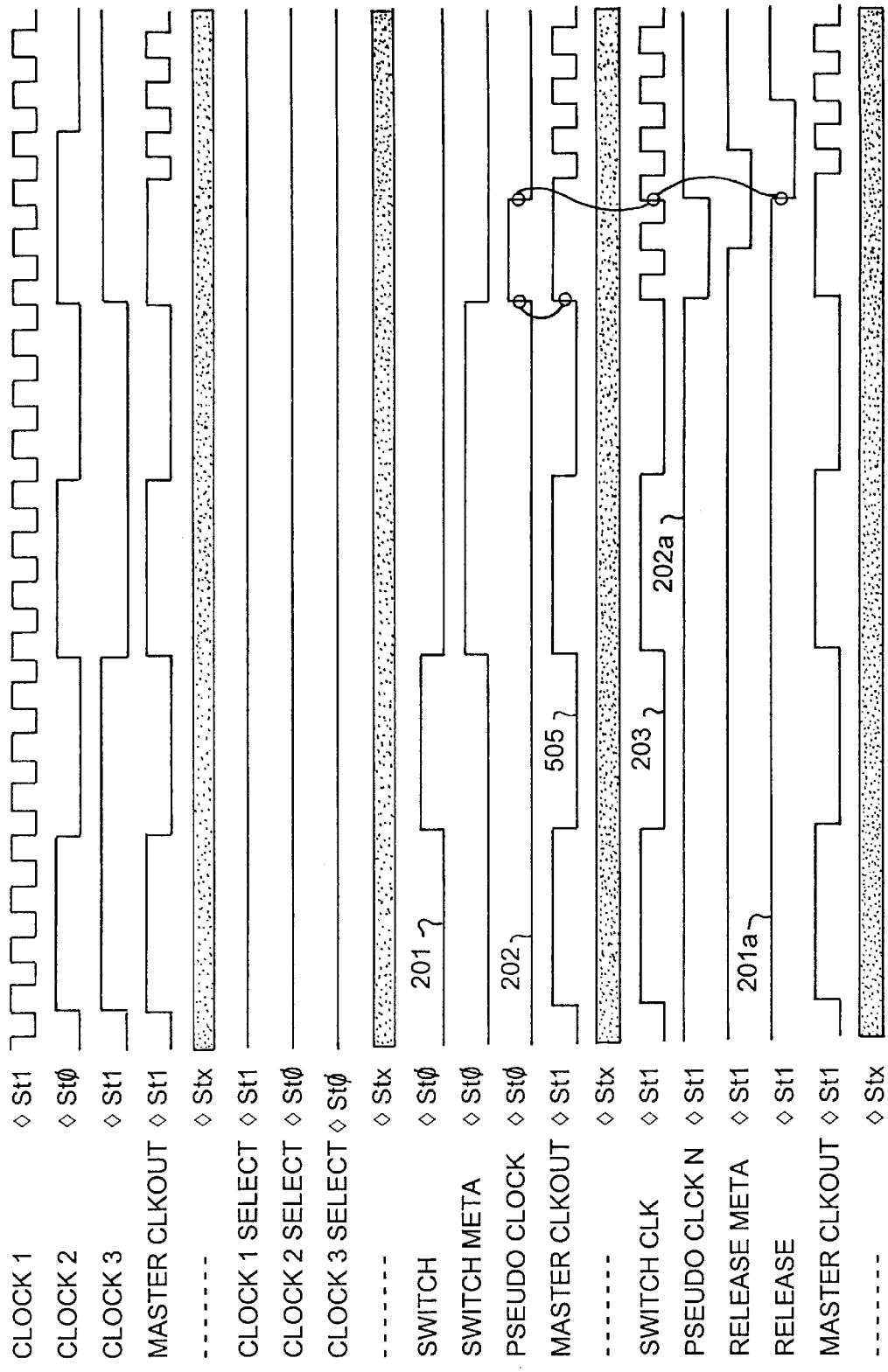
FIG. 2 is a timing diagram illustrating the switching process between two clock sources in the clock switching apparatus of FIG. 1.

As shown in FIG. 1, each CLOCK_1_SELECT, CLOCK_2_SELECT, ..., CLOCK_N_SELECT signal is input to a respective data input terminal of a respective D-type flip flop latch circuit, labeled in FIG. 1 as latch circuits 100, 101, and 102, respectively. As will be described, each latch circuit 100–102 includes a corresponding clock input 100a, 101a and 102a, each receiving a PSEUDO_CLOCK control signal 202, for latching a respective CLOCK_1_SELECT, CLOCK_2_SELECT, ..., CLOCK_N_SELECT signal for the clock source to be switched. FIG. 2 illustrates a timing diagram including example clock signals input to the system of FIG. 1 with like signals identified by common reference numbers/labels.

Additionally, associated with each clock source is a corresponding AND gate labeled in FIG. 1 as AND gates

400, 401, and 402. As shown, each AND gate 400–402 receives two inputs, the actual clock input signal CLOCK__1, CLOCK__2, . . . , CLOCK__N, and the latched output of its respective D-type latch circuit 100–102. Thus, in accordance with the state of the D-type latches 100–102, and respective CLOCK__1__SELECT, CLOCK__2__SELECT, . . . , CLOCK__N__SELECT signals, the AND gates will either admit or prevent a clock signal CLOCK__1, CLOCK__2, . . . , CLOCK__N from passing through to the MUX tree 103.

As further shown in FIG. 1, each output signal from AND gate 400–402 is input to a multiplexor ("MUX") circuit 103 comprising (OR) logic gates 500–504 in a tree configuration to accomplish the logical selection of the proper clock source which is output as MASTER__CLKOUT signal 505. Although only three clock sources are shown and described herein with respect to FIG. 1, it should be understood that any number of clock sources may be switched, which number is only limited by the number and levels of MUXing required, i.e., the speed of the MUX must be faster than the width of the fastest clock source. Alternately, a different type of MUXing known as "passgates" could be used.

Additionally provided is switch circuitry 200 comprising two D-type flip flop latches labeled latches 200a and 200b, and, meta-stable latch circuitry 104 comprising two D-type flip flop latches labeled latches 104a and 104b in FIG. 1. Each D-type latch 200a, b of switch circuitry 200 performs latching of data upon transition of a clock input, which, in the preferred embodiment, is the current MASTER__CLKOUT signal 505. Likewise, each D-type latch 104a, b of latches 104 perform latching of data upon transition of a clock input, which, is shown in FIG. 1 as a SWITCH__CLK signal 203 tapped off an intermediate OR gate 503 of MUX tree 103. As will be hereinafter described these switching circuits establish the duration of the PSEUDO__CLOCK control signal 202, output of the second switch circuit latch 200b, in a manner so as to avoid all metastability problems, and to accomplish glitch-free clock switching at the MASTER__CLKOUT signal 505 of the MUX tree 103.

According to the principles of the invention, glitch-free switching between a first (current) clock source, e.g., CLOCK__2, to a second clock source, e.g., CLOCK__1, will now be described. In the preferred embodiment, switching is initiated by a SWITCH control signal 201 as shown in FIG. 1. As shown in the timing diagram of FIG. 2, SWITCH control signal 201 is a pulse of predetermined duration. This SWITCH control signal 201 is latched into the first D-type latch 200a of latch circuitry 200 upon low to high transition of the MASTER__CLKOUT signal 505, as shown in FIG. 2. Latching of the SWITCH control signal 201 creates a SWITCH__META signal output from D-latch 200a which is input to second D-latch 200b. The output of second D-latch 200b creates PSEUDO__CLOCK signal 202 which functions to latch the clock selection signal into selection latches, 100, 101, and 102. In the illustrative timing diagram of FIG. 2, CLOCK__1__SELECT is the new clock to be switched and consequently is set high, e.g., logic 1, with the remaining clock selection signals being set low. Preferably, the clock selection control signals CLOCK__1__SELECT, CLOCK__2__SELECT, . . . , CLOCK__N__SELECT are set anytime prior to enabling the SWITCH signal 201.

In the preferred embodiment, the PSEUDO__CLOCK signal 202 is additionally input to OR gate 502 of MUX tree 103, to inhibit the MASTER__CLOCK 505 from toggling when the present clock source switches. This initial part of the switch is accomplished by setting and holding on the positive section of the current clock (MASTER__CLKOUT), which is accomplished by PSEUDO__CLOCK pulse signal 202, as shown in FIG. 2. Specifically, the PSEUDO__CLOCK signal 202 input to OR gate 502 functions to provide a logic 1 input to output OR gate 504 in the MUX. Thus, by generation of the PSEUDO__CLOCK signal 202, the output clock is stopped and held at a high level thereby extending the current output level of the clock.

With the selection latches 100–102 now having been switched, the new clock source (CLOCK__1) generates a SWITCH__CLK signal 203, shown in FIG. 1 as output of OR gate 503.

In the preferred embodiment, SWITCH__CLK 203 is used to clock the two metastable latches 104a and 104b of metastable latches 104 that pass an inverted pseudo-clock signal labeled in FIG. 1 as PSEUDO__CLOCK__N 202a as a signal. The metastable latch circuit 104 is provided to prevent any glitches or short clock pulses that may be present in SWITCH__CLK signal 203. The PSEUDO__CLOCK__N 202a is then latched twice, inverted, and used to create a RELEASE signal 201a for resetting the switch latch circuit 200 creating the pseudo-clock signal 202. Particularly, the final latch of PSEUDO__CLOCK__N signal 202a generates a RELEASE signal 201a which resets each of the latches 200a, b upon the rising edge of the SWITCH__CLK signal 203, as shown in FIG. 2. This results in the PSEUDO__CLOCK signal 202 being set to zero or off while the SWITCH__CLK signal 203 is high. The MASTER__CLKOUT will then track the SWITCH__CLK signal 203 exactly and the switching function is accomplished.

It should be understood that the only additional requirement of the switching circuit 10 of the present invention is that the SWITCH signal 201 must be turned off in the first output clock cycle after the switch to prevent a new switch will occur. This is shown in the timing diagram of FIG. 2.

Thus, in accordance with the invention, clock switch control circuit 10 does not rely on any relative timing or frequency between the current clock source and the new clock source.

The low power nature of the clock switch control circuit 10 is attributed to its ability to switch without the requirement of a higher frequency clock signal input but rather, with the input clock source signals only. Furthermore, switching between two clock sources from among N sources only requires latching of two flip flops, e.g., 100, 102, and only requires powering of active branches in the OR-gate MUX tree. Additionally, a minimum number of metastable latches 104 is provided to prevent metastable conditions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims. For instance, the output clock can be switched from high to low and low to high. Additionally, two different clocks sources having the same frequency but different phases can also be switched.

What is claimed is:

1. A clock switching apparatus for switching a clock source from among one or more asynchronous clock sources, the apparatus comprising:

means for selecting an asynchronous clock source from among said one or more asynchronous clock sources;

multiplexor means capable of receiving one selected clock source and outputting a corresponding system clock output;

first switch means responsive to a switching control signal and a system clock output corresponding to a first asynchronous clock source for generating a first control signal, said selecting means responsive to said first control signal for coupling a selected second asynchronous clock source signal into said multiplexor means, and said multiplexor means further responsive to said first control signal for said maintaining said system clock output at a constant level; and, second switch means responsive to a second control signal and said coupled second asynchronous clock source signal to provide a reset signal input to said first switching means for resetting said first control signal, wherein said multiplexor means is responsive to said reset first control signal to provide a system clock output corresponding to said second asynchronous clock source.

2. The apparatus as claimed in claim 1, wherein said means for selecting said second asynchronous clock source from among said one or more asynchronous clock sources comprises:

a clock selection signal associated with each asynchronous clock source and activated upon selection of a corresponding one of said asynchronous clock sources to be switched; and, a selection latch circuit associated with each asynchronous clock source and receiving a respective said clock selection signal.

3. The apparatus as claimed in claim 2, wherein said selection latch circuit responds to said first transition of said first control signal to enable admission of said selected second asynchronous clock source having an activated clock selection signal input.

4. The apparatus as claimed in claim 1, wherein said first switch means includes a first latch means having an input for receiving said switching control signal, and an input receiving said first system clock output, and latching said switching control signal upon an edge transition of said first system clock output.

5. The apparatus as claimed in claim 4, wherein said first switch means further includes second latch means having an input receiving said latched switching control signal, and an input receiving said first system clock output, said second latch means generating said first control signal upon an edge transition of said first system clock output.

6. The apparatus as claimed in claim 1, wherein said second switch means comprises a first latch means having an input for receiving said second control signal, and an input receiving said coupled second asynchronous clock source, said first latch means latching said second control signal upon transition of said coupled second asynchronous clock source.

7. The apparatus as claimed in claim 6, wherein said second switch means further includes a second latch means having an input for receiving said latched second control signal, and an input receiving said coupled second asynchronous clock source, said second latch means generating said reset signal upon an edge transition of said coupled second asynchronous clock source.

8. The apparatus as claimed in claim 1, wherein said multiplexor means includes a plurality of gate devices connected as a tree structure, a single output gate device of said tree structure receiving said reset first control signal for enabling glitch-free switching of said system clock output corresponding to said first asynchronous clock source to a system clock output corresponding to said second asynchronous clock source.

9. The apparatus as claimed in claim 8, wherein said coupled second asynchronous clock source is communicated to said second switch means from an output of one of said plurality of gates located in said tree structure.

10. The apparatus as claimed in claim 6, wherein said first switching means further generates said second control signal, said second control signal comprising said first control signal of inverted polarity.

11. A clock switching system for providing synchronous switching of an input clock source from among one or more asynchronous clock sources, said system comprising:

multiplexor means for providing a system clock output signal corresponding to a first asynchronous clock source input;

switch control means for generating first and second control signals;

means responsive to said first control signal for coupling a selected second asynchronous clock source to be switched to said multiplexor means, and decoupling said first asynchronous clock source input while maintaining said system clock output at a first output level corresponding to said first asynchronous clock source; and, means responsive to said second control signal for resetting said coupling means to enable coupling of said second asynchronous clock source to said system clock output, said second asynchronous clock source being coupled to said system clock output while at said first output level, wherein a transition to said system clock output signal corresponding to said second asynchronous clock source occurs in synchronism with a transition of said second asynchronous clock source from said first output level to a second output level.

12. A method for switching among one or more asynchronous clock source inputs, said method comprising:

providing a system clock output of a multiplexor device corresponding to a first asynchronous clock source input;

asserting a first control signal in response to a system clock output signal for coupling a selected second asynchronous clock source input to be switched to said multiplexor device;

decoupling said first asynchronous clock source input in response to said first control signal, and simultaneously holding said system clock output at a constant output level; and, in response to a transition of said second coupled asynchronous clock source from said multiplexor, resetting said first control signal for switching said system clock output from said constant output level to correspond to said second asynchronous clock source input.

* * * * *

UNITED STATES PATENT AND TRADEMARK OFFICE
CERTIFICATE OF CORRECTION

PATENT NO.    : 6,107,841
DATED         : August 22, 2000
INVENTOR(S)   : K.J. Goodnow, et al.

It is certified that error appears in the above-identified patent and that said Letters Patent is hereby corrected as shown below:

Title page,
[57] ABSTRACT: "signal." should read -- signals. --

Column 5, Claim 1:
Line 6, "for said maintaining said" should read -- for maintaining said --

Signed and Sealed this

Twenty-eighth Day of August, 2001

Attest:

NICHOLAS P. GODICI
Attesting Officer    Acting Director of the United States Patent and Trademark Office